United States Patent Office 2,749,376
Patented June 5, 1956

2,749,376
SYNTHESIS OF 1,1-DIFLUORINATED HYDROCARBONS

Paul Tarrant and Marvin R. Lilyquist, Alachua County, Fla., assignors to the United States of America as represented by the Secretary of the Army No Drawing. Application August 17, 1954,
Serial No. 450,565

18 Claims. (Cl. 260—653)

This invention relates to the synthesis of 1,1-difluorinated hydrocarbons, and more particularly to the synthesis of 1,1-difluorinated dienes and homologs thereof from 1,1,1,4-tetrachloro-3-bromobutane (or certain homologs thereof), and to the production of several 1,1-difluorinated intermediate compounds in the course of such synthesis.

The 1,1-difluorinated dienes which may be synthesized in accordance with the process herein claimed, are represented by the general formula $F_2C:CY^1.CY^2:CH_2$ wherein $Y^1$ and $Y^2$ are either hydrogen or methyl; representative dienes falling under this general formula are 1,1-difluorobutadiene-1,3, 1,1-difluoro-2-methyl-butadiene-1,3 and 1,1-difluoro-3-methyl-butadiene-1,3, which compounds are disclosed and claimed in copending application Serial No. 355,848, Paul Tarrant and Alan M. Lovelace, filed May 18, 1953, assigned to the Government of the United States as represented by the Secretary of the Army. The starting materials are represented by the general formula $Cl_3C.CHY^1.CY^2Br.CH_2Cl$ wherein $Y^1$ and $Y^2$ are either hydrogen or methyl; representative starting compounds are 1,1,1,4-tetrachloro-3-bromobutane, 1,1,1,4-tetrachloro-2-methyl-3-bromobutane, and 1,1,1,4-tetrachloro-3-methyl-3-bromobutane.

The conversion of the saturated unfluorinated starting compounds to the 1,1-difluorinated dienes takes place, in accordance with the present invention, by replacing two chlorine atoms on the 1-carbon of the starting material with two fluorine atoms, and converting the intermediate product by dehydrobromochlorination (i. e. by removal of 1 mol of BrCl and 1 mol of HCl) to the 1,1-difluoro diene; we prefer to carry out the dehydrobromochlorination reaction in two stages, preferably by first removing 1 mol of BrCl to form a 1-chloro-1,1-difluoro alkene, and then removing 1 mol of HCl for the formation of the end product 1,1-difluorinated diene. In the case of conversion of 1,1,1,4-tetrachloro-3-bromobutane to 1,1-difluoro-butadiene-1,3, this may be represented by the following type reaction:

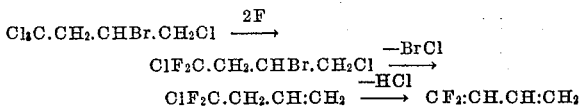

We have found that the desired replacement of two chlorine atoms in the 1-position of the starting material of the type formula $Cl_3CHY^1.CY^2Br.CH_2Cl$ (wherein $Y^1$ and $Y^2$ have the meanings above indicated) can be effected with high yields by reacting it with a fluoro compound of antimony, preferably with a mixture of two different fluoro compounds of antimony, sc. antimony trifluoride and antimony trifluorodichloride, which results in the formation of a first, saturated, intermediate compound of the general type formula

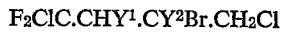

Removal of 1 mol of BrCl from this first intermediate compound, e. g., by reaction with powdered zinc, results in the formation of a second intermediate compound, a 1,1-difluorinated alkene of the type formula

This second intermediate compound is then converted by dehydrochlorination, i. e., removal of 1 mol of HCl, e. g., by refluxing with a base, e. g., potassium hydroxide, into the 1,1-difluorinated diene of the type formula $F_2C:CY^1.CY^2:CH_2$.

The starting material 1,1,1,4-tetrachloro-3-bromobutane may be readily obtained by reacting bromotrichloromethane with allyl chloride as set forth, for instance, in Kharasch Patent No. 2,468,208, and we lay no claim to this particular reaction. Its 2- and 3-methyl substituted homologs can be synthesized by analogous reactions, for which see also Kharasch Patent No. 2,574,832.

After a series of experiments we have found that high yields, of the order of 51%, of the saturated 1,1-difluoro intermediate compound are obtained by reacting the starting compound, e. g., 1,1,1,4-tetrachlorobromobutane by reaction with a fluoro compound of antimony, e. g., with a mixture of antimony trifluoride and antimony trifluorodichloride. This first intermediate compound is then de-hydrobromochlorinated to form the desired 1,1-difluorinated diene in accordance with the type reactions outlined above, which type reactions will be illustrated by specific examples in the following portion of our specification. The yield of the first intermediate compound is materially affected by the concentration of the fluoro antimony compounds in terms of the starting material; thus, a 51% yield was achieved with a concentration of a mixture of 1.7 mols of antimony trifluoride and 1.3 mols antimony trifluorodichloride, while at a concentration of .6 mols and .4 mols of the same antimony fluoro compounds the yield was only 17%.

The physical constants of typical intermediate and final products herein mentioned are set forth in the following table:

TABLE

| Compound | B. P., °C. | P., mm. Hg | T., °C. | $n_D^{25}$ | $d_4^{25}$ | MR_D | |
|---|---|---|---|---|---|---|---|
| | | | | | | Calcd. | Found |
| 1,1-difluoro-1,4-dichloro-3-bromo-butane $CF_2ClCH_2CHBrCH_2Cl$ | 52.4 | 10 | 25 | 1.4551 | 1.731 | 37.97 | [1] 37.93 |
| 1-chloro-1,1-difluoro-butene-3 $CF_2ClCH_2CH=CH_2$ | 49.2 | 760 | 25 | 1.3550 | 1.103 | 24.88 | [2] 24.88 |
| 1, 1-difluoro-butadiene-1, 3 $CF_2=CHCH=CH_2$ | 3.5–4.0 | 760 | | | | | |
| 1,1-difluoro-2-methyl-butadiene-1, 3 $CF_2:CCH_3.CH:CH_2$ | 39.0 | 760 | 25 | 1,3756 | 0.9582 | 24.35 | 25.1 |
| 1,1-difluoro-3-methyl-butadiene-1, 3 $CF_2:CH.CCH_3:CH_2$ | 35.5 | 760 | 25 | 1,3705 | 0.9463 | 24.35 | 24.875 |

[1] Silver equivalent=molecular weight divided by the number of halogen atoms other than fluorine: calculated 80.3, found 80.0.
[2] Chlorine: calculated 28.0%, found 28.3%.

The following specific examples will set forth several preferred ways in which our invention may be practiced; however, it will be understood that such examples are given by way of illustration and not of limitation, and are not intended to limit the scope of our invention to specific proportions, temperatures and similar data therein set forth.

*Example Ia*

FLUORINATION OF 3-BROMO-1,1,1,4-TETRACHLOROBUTANE

Powdered antimony trifluoride (3 mols) was placed in a flask equipped with stirrer and reflux condenser. A stream of chlorine was introduced near the bottom of the flask until 90 grams (1.3 mols) had been absorbed. The flask was then carefully cooled in an ice bath to give a thin film of $SbF_3.SbF_3Cl_2$ which could be broken up and dispersed throughout the organic compound to be fluorinated. After the addition of $CCl_3CH_2CHBrCH_2Cl$ (550 g., 2 mols) vigorous stirring was begun and the mixture allowed to warm to 40–50° where it was maintained for three hours.

The reaction mixture was made slightly basic with potassium carbonate and steam distilled to give 356 g. of organic product. Fractionation through a 40 cm. column packed with protruded packing gave a forerun of 16.5 g. of $CF_2ClCH_2CHFCH_2Cl$, B. P. 38–50°/27 mm., a main fraction of 274 g. (51% yield) of 1,1-difluoro-1,4-dichloro-3-bromobutane ($CF_2ClCH_2CHBrCH_2Cl$), B. P. 52–57°/11 mm., and a final fraction of 32 g. (6.2% conversion) of $CFCl_2CH_2CHBrCH_2Cl$, B. P. 77.4°/10 mm., $n_D^{25}$ 1.4916, $d_4^{25}$ 1.784, $MR_D$ calcd. 42.9, found 41.8, silver eq. calcd. 64.6, found 65.1.

*Example Ib*

Example Ia was repeated, with reduced amounts of antimony fluoride (1 mol) and chlorine (.6 mol); reaction temperature with $CCl_3CH_2CHBrCH_2Cl$ was 62° C. 17% yield of $CF_2ClCH_2CHBrCH_2Cl$ was obtained.

*Example II*

FORMATION OF 1-CHLORO-1,1-DIFLUOROBUTENE-3

0.93 mol of $CF_2ClCH_2CHBrCH_2Cl$ was added to a vigorously stirred slurry of zinc dust (1.54 mols) and isopropanol (110 ml.) maintained at refluxing temperature. After 3 hours refluxing, the mixture was steam distilled and the water insoluble layer separated, dried and fractionated to give a 79% yield of 1-chloro-1,1-difluorobutene-3 ($CF_2ClCH_2CH=CH_2$), B. P. 49.2°.

*Example III*

FORMATION OF 1,1-DIFLUOROBUTADIENE-1,3

A solution of 2.68 mols of potassium hydroxide in 450 g. of ethanol was slowly added to 1.66 mols of $$CF_2ClCH_2CH=CH_2$$

(obtained according to Example II) in a flask equipped with stirrer, addition funnel and reflux condenser connected to traps cooled in Dry Ice (solidified $CO_2$). The heat of the reaction was sufficient to maintain a gentle reflux. Reflux was maintained for one hour after the addition. The product in the cold trap was distilled through a vacuum jacketed column to give 50 g. of 1,1-difluorobutadiene-1,3 ($CF_2=CHCH=CH_2$), B. P. 3.5–5.0°. The 1,1-difluorobutadiene-1,3 polymerized on standing to an elastomer.

*Example IV*

Example Ia was repeated with 2 mols of 1,1,1,4-tetrachloro-2-methyl-3-bromobutane as the starting material, and the first 1,1-difluorinated, saturated, intermediate compound thus obtained was converted to 1,1-difluoro-2-methyl-butadiene-1,3 (B. P. 39° C.) by dehydrobromochlorination through the successive reactions of Examples II and III.

*Example V*

1,1-difluoro-3-methyl-butadiene-1,3 (B. P. 35.5° C.) was obtained by following the procedure of Example IV, but using 2 mols of 1,1,1,4-tetrachloro-3-methyl-3-bromobutane as starting material.

We have also found that the 1,1,4-trichloro-1-fluoro-3-bromobutane ($CFCl_2.CH_2.CHBr.CH_2Cl$) obtained as the final fraction of Example Ia can be converted to 1-chloro-1-fluoro-butadiene-1,3 by a dehydrobromochlorination reaction analogous to Examples III and IV. 1-chloro-1-fluoro-butadiene polymerizes on standing in the open to a vulcanizable elastomer. The following example describes a preferred way of accomplishing this dehydrobromochlorination reaction in two steps.

*Example VIa*

DEBROMOCHLORINATION OF 1,1,4-TRICHLORO-1-FLUORO-3-BROMOBUTANE 1 mol of $CFCl_2.CH_2.CHBr.CH_2Cl$ obtained as the final fraction in Example Ia was added to a vigorously stirred slurry of zinc dust (1.3 mols) in methanol (380 ml.) maintained at the reflux temperature. The reaction was carried out in three hours. The mixture was steam distilled and the water insoluble layer separated, dried and fractionated to give 58 g. of 1,1-dichloro-1-fluoro-butene-3 ($CFCl_2CH_2.CH:CH_2$), B. P. 88° at 760 mm. Hg; $n_D^{25}$ 1.4104; $d_4^{25}$ 1.188; $MR_D$ calc'd. 39.85, found 30.00; chlorine calc'd. 49.6%, found 49.6%.

*Example VIb*

FORMATION OF 1-CHLORO-1-FLUORO-BUTADIENE

To a refluxing solution of 0.4 mol of 1,1-dichloro-1-fluorobutene-3 (obtained according to Example VIa) in ethanol was added dropwise a solution of potassium hydroxide (0.63 mol) in 120 ml. of ethanol. The addition was carried out over a period of one and a half hours and the mixture was refluxed an additional hour. The product was washed with water, dried and distilled to give 23 g. (53.5% yield) of 1-chloro-1-fluorobutadiene-1,3 ($CFCl:CH.CH:CH_2$), B. P. 53.4° C. at 760 mm. Hg; $n_D^{25}$ 1.4267; $d_4^{25}$ 1.066; $MR_D$ calc'd. 24.51, found 25.50.

The respective intermediate compounds 1-chloro-1,1-difluorobutene-3 (Example II) and 1,1-dichloro-1-fluorobutene-3 (Example VIa) may be expressed by the general formula $HalClFC.CH_2.CH:CH_2$, wherein Hal is F or Cl.

From the foregoing description of our invention it will be apparent to those skilled in the art that 1,1-difluorinated dienes can be obtained from 1,1,1,4-tetrachloro-3-bromobutane and its homologs, by converting two chlorine atoms in the 1-position of the starting material into fluorine atoms, and dehydrobromochlorinating the intermediate saturated compound thus formed. The resulting end products are polymerized and vulcanizable to form elastomers having valuable industrial properties more fully set forth in copending application Serial No. 355,848. We do not wish to be understood to limit the scope of our invention to the examples specifically herein set forth, inasmuch as modifications and adaptations within the spirit of our invention will readily occur to those skilled in the art. We thus intend to claim our invention broadly and to define its scope by the appended claims.

We claim:

1. The process of converting a compound having the general formula $Cl_3C.CHY^1.CBrY^2.CH_2Cl$ wherein $Y^1$ and $Y^2$ are members of the group consisting of hydrogen and methyl, into a compound having the general formula $FXC:CY^1.CY^2:CH_2$ wherein X is a member of the group consisting of chlorine and fluorine and wherein $Y^1$ and $Y^2$ have the same meanings as aforesaid, comprising reacting said first-named compound with a fluoro compound of antimony, whereby an intermediate compound

$FXClC.CHY^1.CBrY^2.CH_2Cl$ is obtained, wherein X, $Y^1$ and $Y^2$ have the same meanings as aforesaid, and debromochlorinating and dehydrochlorinating said intermediate compound.

2. The process of converting a compound having the general formula $Cl_3C.CHY^1.CBrY^2.CH_2Cl$ wherein $Y^1$ and $Y^2$ are members of the group consisting of hydrogen and methyl, into a compound having the general formula $F_2C:CY^1.CY^2:CH_2$ wherein $Y^1$ and $Y^2$ have the same meanings as aforesaid, comprising reacting said first-named compound with a fluoro compound of antimony, and debromochlorinating and dehydrochlorinating the intermediate 1,1-difluorinated compound thus obtained.

3. The process of converting 1,1,1,4-tetrachloro-3-bromo-butane into 1,1-difluoro-butadiene, comprising reacting said 1,1,1,4-tetrachloro-3-bromo-butane with a fluoro compound of antimony, and debromochlorinating and dehydrochlorinating the intermediate 1,1-difluorinated compound thus obtained.

4. The process of converting 1,1,1,4-tetrachloro-2-methyl-3-bromo-butane into 1,1-difluoro-2-methyl-butadiene, comprising reacting said 1,1,1,4-tetrachloro-2-methyl-3-bromo-butane with a fluoro compound of antimony, and debromochlorinating and dehydrochlorinating the intermediate 1,1-difluorinated compound thus obtained.

5. The process of converting 1,1,1,4-tetrachloro-3-methyl-3-bromo-butane into 1,1-difluoro-3-methyl-butadiene, comprising reacting said 1,1,1,4-tetrachloro-3-methyl-3-bromo-butane with a fluoro compound of antimony, and debromochlorinating and dehydrochlorinating the intermediate 1,1-difluorinated compound thus obtained.

6. The process of converting a compound having the general formula $Cl_3C.CHY^1.CBrY^2.CH_2Cl$ wherein $Y^1$ and $Y^2$ are members of the group consisting of hydrogen and methyl, into a compound having the general formula $F_2C:CY^1.CY^2:CH_2$ wherein $Y^1$ and $Y^2$ have the same meanings as aforesaid, comprising reacting said first-named compound with a mixture of antimony trifluoride and antimony trifluorodichloride, and debromochlorinating and dehydrochlorinating the intermediate 1,1-difluorinated compound thus obtained.

7. The process of converting 1,1,1,4-tetrachloro-3-bromo-butane into 1,1-difluoro-butadiene, comprising reacting said 1,1,1,4-tetrachloro-3-bromo-butane with a mixture of antimony trifluoride and antimony trifluorodichloride, and debromochlorinating and dehydrochlorinating the intermediate 1,1-difluorinated compound thus obtained.

8. The process of converting 1,1,1,4-tetrachloro-3-bromobutane into 1,1-difluoro-butadiene, comprising reacting said 1,1,1,4-tetrachloro-3-bromobutane with a fluoro compound of antimony, and debromochlorinating and dehydrochlorinating the intermediate compound 1,1-difluoro-1,4-dichloro-3-bromobutane thus obtained.

9. The process of converting 1,1,1,4-tetrachloro-3-bromobutane into 1,1-difluoro-butadiene, comprising reacting said 1,1,1,4-tetrachloro-3-bromobutane with a fluoro compound of antimony, debromochlorinating the intermediate compound 1,1-difluoro-1,4-dichloro-3-bromobutane thus obtained, and dehydrochlorinating the 1-chloro-1,1-difluoro-butene-3 obtained by said last named reaction.

10. The process of converting 1,1,1,4-tetrachloro-3-bromobutane into 1,1-difluoro-butadiene, comprising reacting said 1,1,1,4-tetrachloro-3-bromobutane with a mixture of antimony trifluoride and antimony trifluorodichloride, debromochlorinating the intermediate compound thus obtained, and dehydrochlorinating the 1-chloro-1,1-difluoro-butene-3 thus obtained.

11. The process of converting 1,1,1,4-tetrachloro-3-bromobutane into 1,1-difluoro-butadiene, comprising reacting said 1,1,1,4-tetrachloro-3-bromobutane with a mixture of antimony trifluoride and antimony trifluorodichloride, reacting the intermediate compound thus obtained with zinc, and reacting the 1-chloro-1,1-difluoro-butene-3 thus obtained with potassium hydroxide.

12. The process of converting a compound having the general formula $Cl_3C.CHY^1.CY^2Br.CH_2Cl$ wherein $Y^1$ and $Y^2$ are members of the group consisting of hydrogen and methyl, into a compound having the general formula $F_2C:CY^1.CY^2:CH_2$, wherein $Y^1$ and $Y^2$ have the same meanings as aforesaid, comprising replacing two chlorine atoms in the 1,1 position of said first-named compound by two fluorine atoms, whereby an intermediate compound having the general formula $$F_2ClC.CHY^1.CY^2Br.CH_2Cl$$

wherein $Y^1$ and $Y^2$ have the same meanings as aforesaid, is obtained, and debromochlorinating and dehydrochlorinating said intermediate compound.

13. The process of converting 1,1,1,4-tetrachloro-3-bromobutane into 1,1-difluoro-butadiene, comprising replacing two chlorine atoms in the 1,1 position of 1,1,1,4-tetrachloro-3-bromobutane by two fluorine atoms, debromochlorinating the intermediate compound 1,1-difluoro-1,4-dichloro-3-bromobutane thus obtained, and dehydrochlorinating the 1-chloro-1,1-difluoro-butene-3 obtained by said last-named reaction.

14. The process of converting 1,1,1,4-tetrachloro-3-bromobutane into 1,1-difluoro-butadiene, comprising replacing two chlorine atoms in the 1,1 position of said first-named compound by two fluorine atoms, and debromochlorinating and dehydrochlorinating the intermediate compound 1,1-difluoro-1,4-dichloro-3-bromobutane thus obtained.

15. The process of converting 1,1,1,4-tetrachloro-3-bromobutane into 1-chloro-1-fluorobutadiene, comprising reacting said first-named compound with a fluoro compound of antimony, separating 1,1,4-trichloro-1-fluoro-3-bromobutane from the reaction product, and debromochlorinating and dehydrochlorinating said last-named compound to form 1-chloro-1-fluoro-butadiene.

16. The process of converting 1,1,1,4-tetrachloro-3-bromobutane into 1-chloro-1-fluorobutadiene, comprising reacting said first-named compound with a fluoro compound of antimony, separating 1,1,4-trichloro-1-fluoro-3-bromobutane from the reaction product, debromochlorinating said 1,1,4-trichloro-1-fluoro-3-bromobutane to form 1,1-dichloro-1-fluorobutene-3, and dehydrochlorinating said 1,1-dichloro-1-fluoro-butene-3 to form 1-chloro-1-fluorobutadiene.

17. 1-chloro-1-fluoro-butadiene.

18. A vulcanizable elastomeric polymer of 1-chloro-1-fluoro-butadiene.

References Cited in the file of this patent

UNITED STATES PATENTS 2,647,110    Wiseman _____ July 28, 1953
2,686,207    Crane et al. _____ Aug. 10, 1954

OTHER REFERENCES

Wakefield: Abstracts of Papers, India Rubber World, vol. 123, pages 581–2 (February 1951).